(12) United States Patent
David et al.

(10) Patent No.: US 11,009,091 B2
(45) Date of Patent: May 18, 2021

(54) CLUTCH WEAR-OUT

(71) Applicant: EATON CORPORATION, Cleveland, OH (US)

(72) Inventors: William Andrew David, Fort Wayne, IN (US); Brent Harold Hoerman, Kalamazoo, MI (US)

(73) Assignee: Eaton Intelligent Power Limited, Dublin (IE)

( * ) Notice: Subject to any disclaimer, the term of this patent is extended or adjusted under 35 U.S.C. 154(b) by 0 days.

(21) Appl. No.: 16/335,867

(22) PCT Filed: Sep. 22, 2017

(86) PCT No.: PCT/US2017/053045
§ 371 (c)(1),
(2) Date: Mar. 22, 2019

(87) PCT Pub. No.: WO2018/057948
PCT Pub. Date: Mar. 29, 2018

(65) Prior Publication Data
US 2019/0257380 A1 Aug. 22, 2019

Related U.S. Application Data

(60) Provisional application No. 62/399,330, filed on Sep. 23, 2016.

(51) Int. Cl.
*F16D 66/02* (2006.01)
*F16D 13/40* (2006.01)
(Continued)

(52) U.S. Cl.
CPC .......... *F16D 66/02* (2013.01); *F16D 13/385* (2013.01); *F16D 13/40* (2013.01); *F16D 13/74* (2013.01);
(Continued)

(58) Field of Classification Search
CPC ........ F16D 66/02; F16D 13/385; F16D 13/40; F16D 13/74; F16D 13/757; F16D 48/06;
(Continued)

(56) References Cited

U.S. PATENT DOCUMENTS 4,440,279 A * 4/1984 Schreiner ................ F16D 13/58
188/1.11 L
4,452,349 A 6/1984 Tscheplak
(Continued)

FOREIGN PATENT DOCUMENTS

DE 4445577 C1 2/1996
WO 9518313 A1 7/1995
(Continued)

OTHER PUBLICATIONS

International Search Report and Written Opinion for PCT/US2017/053045 dated Dec. 15, 2017; pp. 1-13.

*Primary Examiner* — Nay Tun
(74) *Attorney, Agent, or Firm* — Mei & Mark, LLP

(57) ABSTRACT

A method of clutch wear notification comprises detecting engaged clutch positions at a first interval and storing the values of the engaged clutch positions. The stored values of the engaged clutch positions can be averaged at a second interval to create running averages, and the running averages can be stored. The running averages are compared at a third interval to determine a rate of change in the clutch positions. A clutch wear-out is signaled when comparing the running averages indicates that the rate of change in the clutch positions deviates from a normal rate of change. The clutch position during an engaged condition can deviate from the normal rate of change when the axial position of the release bearing begins to increase due to an adjustment mechanism ceasing to adjust.

14 Claims, 8 Drawing Sheets

(51) Int. Cl.
*F16D 13/74* (2006.01)
*F16D 13/75* (2006.01)
*F16D 48/06* (2006.01)
*F16D 13/38* (2006.01)
*F16D 66/00* (2006.01)

(52) U.S. Cl.
CPC ........... *F16D 13/757* (2013.01); *F16D 48/06* (2013.01); *F16D 66/00* (2013.01); *F16D 2066/003* (2013.01); *F16D 2066/006* (2013.01); *F16D 2500/3026* (2013.01); *F16D 2500/5023* (2013.01); *F16D 2500/50233* (2013.01); *F16D 2500/70673* (2013.01)

(58) Field of Classification Search
CPC ............... F16D 66/00; F16D 2066/003; F16D 2066/006; F16D 2500/3026; F16D 2500/5023; F16D 2500/50233; F16D 2500/70673
See application file for complete search history.

(56) References Cited

U.S. PATENT DOCUMENTS

| | | | |
|---|---|---|---|
| 4,474,274 A | 10/1984 | Lutz et al. | |
| 4,561,530 A | 12/1985 | Parsons et al. | |
| 4,646,891 A | 3/1987 | Braun | |
| 4,899,858 A | 2/1990 | Cote et al. | |
| 5,181,593 A * | 1/1993 | Flotow | F16D 13/58 |
| | | | 192/30 W |
| 5,390,497 A | 2/1995 | Cottam | |
| 5,531,308 A | 7/1996 | Gochenour et al. | |
| 5,791,448 A | 8/1998 | Gochenour et al. | |
| 6,029,787 A | 2/2000 | Reik et al. | |
| 6,062,365 A | 5/2000 | Gochenour | |
| 6,109,412 A | 8/2000 | Cole | |
| 6,206,158 B1 * | 3/2001 | Muller | F16D 13/58 |
| | | | 116/208 |
| 6,273,229 B1 | 8/2001 | Kimmig et al. | |
| 6,347,694 B1 | 2/2002 | Szadkowski et al. | |
| 6,491,151 B1 * | 12/2002 | Weidinger | F16D 13/58 |
| | | | 192/111.2 |
| 6,502,680 B2 | 1/2003 | Doremus et al. | |
| 6,502,681 B1 * | 1/2003 | Ota | F16D 48/064 |
| | | | 192/103 R |
| 6,755,294 B2 | 6/2004 | Ziegler et al. | |
| 8,346,451 B2 * | 1/2013 | Otanez | F16D 48/02 |
| | | | 701/67 |
| 8,380,411 B2 * | 2/2013 | Takei | F16D 48/066 |
| | | | 701/68 |
| 8,442,734 B2 * | 5/2013 | Desfriches | B60W 40/12 |
| | | | 701/68 |
| 8,651,256 B2 * | 2/2014 | Bitzer | F16D 66/026 |
| | | | 192/30 W |
| 8,751,123 B2 | 6/2014 | Zenno | |
| 8,997,963 B2 | 4/2015 | Reinoehl et al. | |
| 10,184,537 B2 * | 1/2019 | Han | F16D 66/021 |
| 2002/0079144 A1 * | 6/2002 | Suzuki | B62D 11/183 |
| | | | 180/6.7 |
| 2004/0000199 A1 | 1/2004 | Otto et al. | |
| 2008/0167155 A1 * | 7/2008 | Kawaguchi | F16H 61/12 |
| | | | 475/119 |
| 2009/0292432 A1 * | 11/2009 | Suzuki | F16D 29/005 |
| | | | 701/68 |
| 2010/0057318 A1 * | 3/2010 | Nedachi | F16D 48/066 |
| | | | 701/68 |
| 2010/0063699 A1 * | 3/2010 | O'Dea | F16D 48/06 |
| | | | 701/67 |
| 2011/0046862 A1 * | 2/2011 | Monti | F16D 48/08 |
| | | | 701/68 |
| 2011/0208396 A1 * | 8/2011 | Otanez | F16D 48/02 |
| | | | 701/67 |
| 2014/0284165 A1 | 9/2014 | Reinoehl et al. | |
| 2015/0285372 A1 * | 10/2015 | Shirai | F16H 61/18 |
| | | | 701/51 |
| 2017/0080923 A1 * | 3/2017 | Johri | B60K 6/387 |
| 2017/0152897 A1 * | 6/2017 | McCutcheon | F16D 13/70 |

FOREIGN PATENT DOCUMENTS

| | | |
|---|---|---|
| WO | 2006041350 A1 | 4/2006 |
| WO | 2014008526 A1 | 1/2014 |
| WO | 2014153558 A1 | 9/2014 |

* cited by examiner

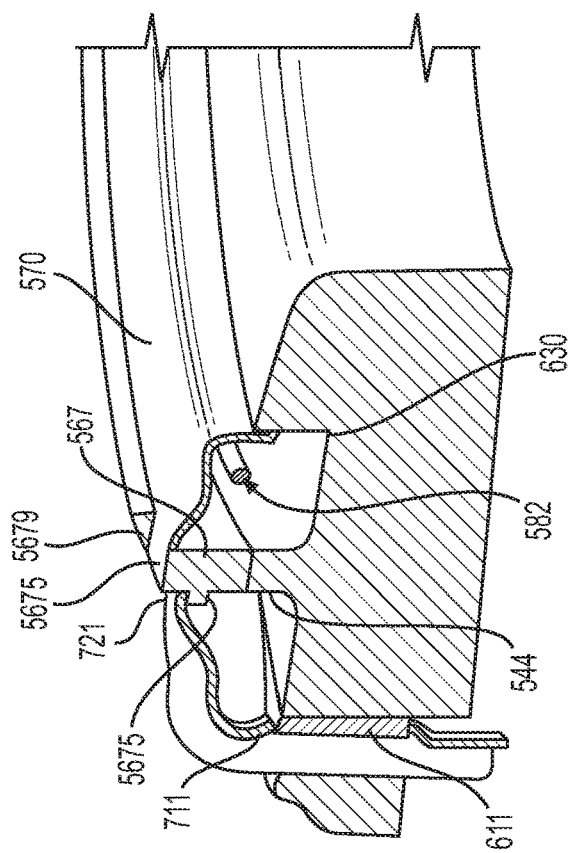
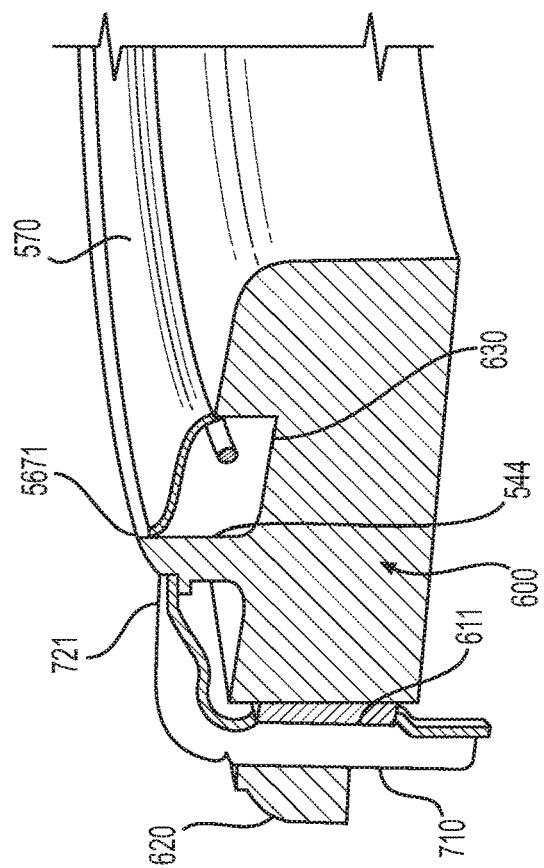

CLUTCH WEAR-OUT

This application claims the benefit of and is a § 371 National Stage entry of Patent Cooperation Treaty Application No. PCT/US2017/053045, filed Sep. 22, 2017, which claims the benefit of U.S. provisional application No. 62/399,330, filed Sep. 23, 2016, all of which are incorporated herein by reference.

FIELD

This application provides methods and devices for clutch wear-out detection.

BACKGROUND

There is a desire to know when a clutch is at or near the end of its wear life. If the friction material wears to the point that the facing rivets are contacting the engine flywheel or pressure plate, there is a risk that the friction material would separate from the driven disk assembly (DDA) which would ultimately result in the sudden inability to transmit torque. Another concern is that the rivets would damage the surface of the engine flywheel which would require resurfacing or replacement of the engine flywheel when the clutch is serviced. So, knowing that a clutch is near the end of its usable wear life so that it can be serviced prior to these issues occurring is advantageous.

SUMMARY

The methods disclosed herein overcome the above disadvantages and improves the art by way of a method of clutch wear notification comprises detecting engaged clutch positions at a first interval and storing the values of the engaged clutch positions. The stored values of the engaged clutch positions can be averaged at a second interval to create running averages, and the running averages can be stored. The running averages are compared at a third interval to determine a rate of change in the clutch positions. A clutch wear-out is signaled when comparing the running averages indicates that the rate of change in the clutch positions deviates from a normal rate of change. The clutch position during an engaged condition can deviate from the normal rate of change when the axial position of the release bearing begins to increase due to an adjustment mechanism ceasing to adjust.

A clutch apparatus can comprise a friction disk, a pressure plate, and an actuator assembly. The actuator assembly can be configured to selectively engage and disengage the pressure plate with the friction disk. The friction disk can be, for example, a driven disk assembly (DDA). An adjustment mechanism can be between the pressure plate and the actuator assembly. The adjustment mechanism can comprise a control finger configured to move from a starting position to an ending position as the adjustment mechanism adjusts a distance between the actuator assembly and the pressure plate in response to wear-down of the friction material. A hard stop mechanism can be configured to stop the movement of the adjustment mechanism when the control finger moves to the ending position.

Additional objects and advantages will be set forth in part in the description which follows, and in part will be obvious from the description, or may be learned by practice of the disclosure. The objects and advantages will also be realized and attained by means of the elements and combinations particularly pointed out in the appended claims.

It is to be understood that both the foregoing general description and the following detailed description are exemplary and explanatory only and are not restrictive of the claimed invention.

BRIEF DESCRIPTION OF THE DRAWINGS

FIG. 3A is a view of the hard stop mechanism with respect to the adjustment mechanism when the adjustment mechanism is in a starting position.

FIG. 3B is a view of the hard stop mechanism with respect to the adjustment mechanism when the adjustment mechanism is in an ending position.

DETAILED DESCRIPTION

Reference will now be made in detail to the examples which are illustrated in the accompanying drawings. Wherever possible, the same reference numbers will be used throughout the drawings to refer to the same or like parts. Directional references such as "left" and "right" are for ease of reference to the figures.

The disclosure provides a means to enable clutch wear notification. Clutch position detection can be achieved in a dry, diaphragm spring, self-adjusting push clutch that is actuated via a clutch actuator with position sensing capability and a clutch release linkage. It should be noted that a similar approach could be taken for other types of mechanical self-adjusting clutches and clutch actuation methods. An alternative is given for wear-through style clutches that do not comprise an adjustment mechanism for self-adjusting.

The disclosure uses position sensing to detect when a clutch needs to be replaced. Position sensing is available to automated systems. Manual systems can also benefit by adding on position sensing capabilities.

This disclosure can be implemented across a range of different types of clutches, including but not limited to push clutch or pull clutch, diaphragm spring clutch or coil spring clutch. Friction disk 400 can comprise a variety of materials, such as organic facings, ceramic facings, among others. Friction disks can be, cushioned friction disks or paddle style friction disks. One or more hard stops are designed into a self-adjust clutch, forcing it to act like a wear through clutch just prior to its end of life, and the change of state would be detected.

This disclosure can also be used to detect the need for clutch replacement with a wear through clutch. Algorithm modifications can be made to program for absolute limits (extrema) for the wear-through clutch while the converting clutches can be without an absolute limit. In either case, determining that a predetermined limit has been reached can lead to clutch wear notification.

Figure 5:
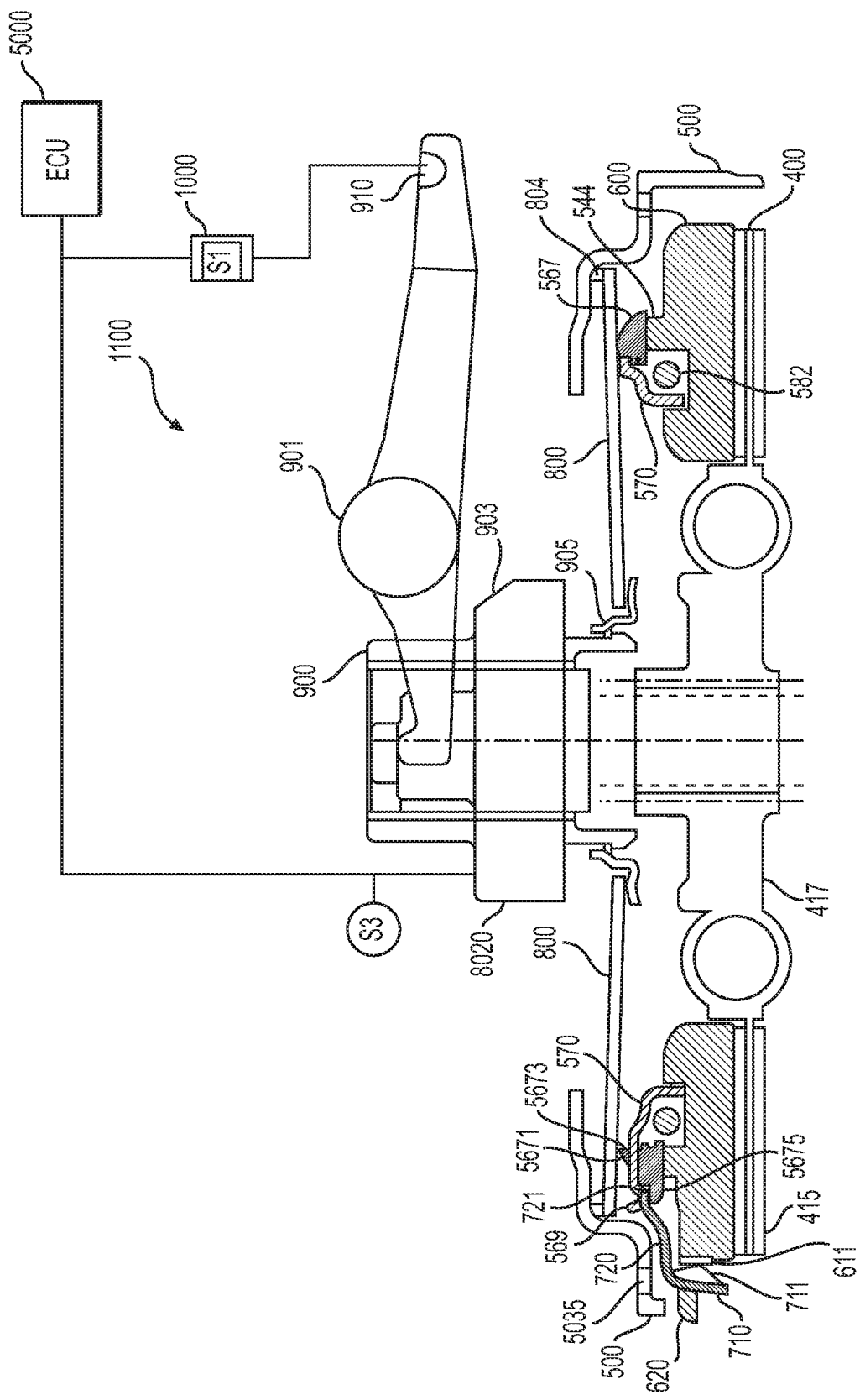
FIG. 5 is an example of a clutch assembly.

One example of a clutch assembly is shown in FIG. 5. A friction material 415 is affixed to a friction disk 400 as part of a driven disk assembly (DDA). A hub 417 comprising damper springs is shown in simplified view. An axle is shown in phantom lines connecting to portions of the actuator assembly 1100. A release bearing 8020 is shown with respect to a linkage 901 of an actuator assembly 8010. Linkage 901 can be a catapult linkage. The linkage 901 can connect to a user interface with a clutch pedal 6010 or to computer (ECU 5000) or other control, such as an actuator 1000. A socket 910 is shown for connecting a ball pin for mounting the linkage 901 to actuator 1000. When the linear actuator pushes on the socket 910, the linkage 901 pivots and lifts up on coupling 900. The actuator assembly 1100 is configured to selectively engage and disengage the pressure plate 600 with the driven disk assembly (friction disk 400).

In this example, coupling 900 is linked to pull on a diaphragm 800. The diaphragm can comprise an elastic plate and fingers or other slots formed to provide a spring force when the diaphragm is mounted. The diaphragm 800 can span between a bracket or other mounting 905 on the coupling 900 to the adjustment mechanism 590 (or other fulcrum, when of the wear-through style) on the pressure plate 600. Diaphragm 800 can also touch or bias against an additional surface, such as against an internal surface of the cover 500 or against another part such as fitting rings 804. Cover 500 can be mounted to a flywheel of an engine to receive torque from the engine when the friction material 415 is pressed to engage with the flywheel. A fastener 5037, such as a shoulder bolt, can be mounted to the cover at port 5035 to secure the pressure plate 600 with respect to the cover 500. A corresponding hole in boss 620 of pressure plate 600 is not shown in FIG. 5.

Figure 1:
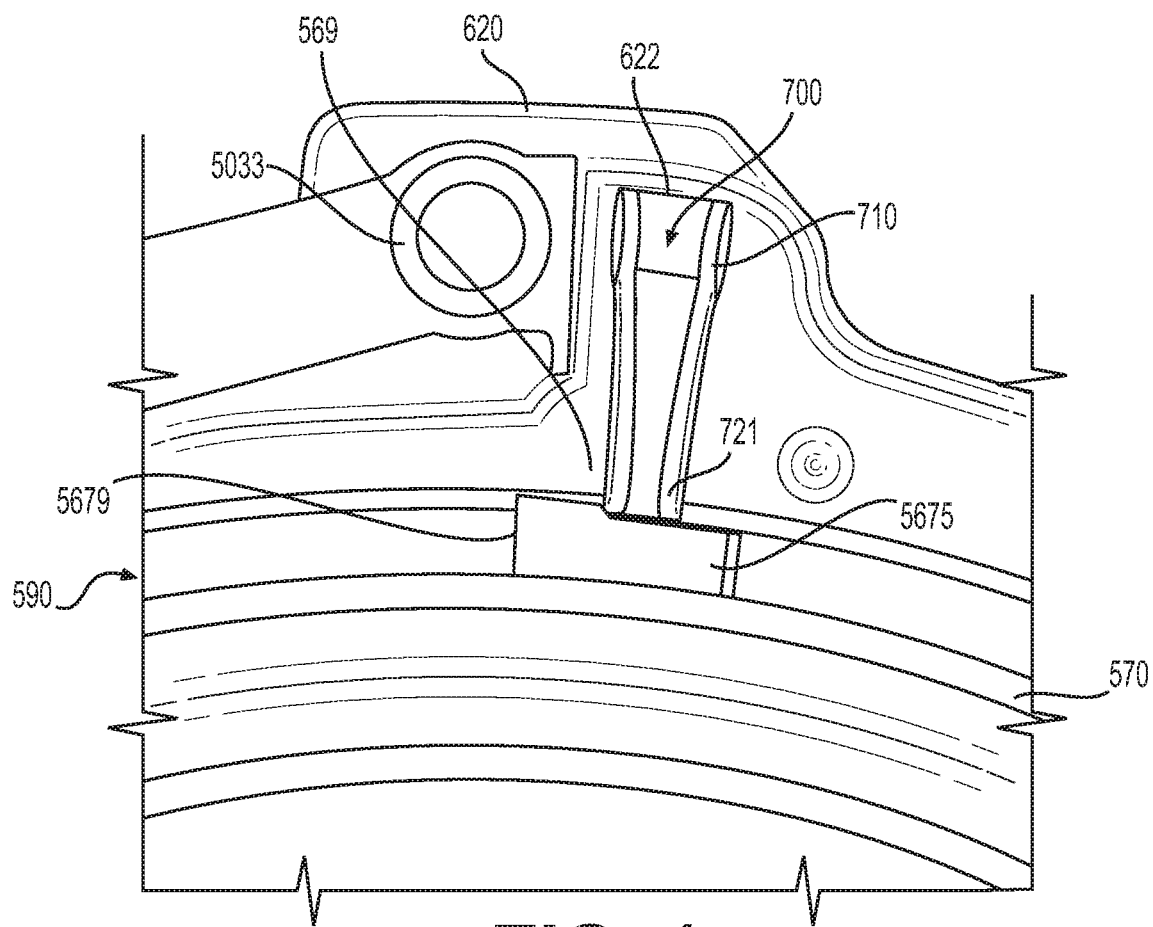
FIG. 1 is a top view of a pressure plate comprising a hard stop mechanism and an adjustment mechanism.

Turning to FIG. 1, an adjustment mechanism is shown in relation to a pressure plate 600. A boss 620 is formed on a periphery of the pressure plate. Boss 620 can mount one or more drive straps via a rivet or like fastener 5033. An example of a clutch compatible with the teachings herein, and comprising a boss and drive strap arrangement is found in US 2017/0152897, owned by Eaton Corporation and incorporated by reference herein in its entirety. The present disclosure adds a hard stop mechanism 700, which is shown seated in a positioning slot 622 in a boss 620 of pressure plate 600. Hard stop mechanism 700 can be stationary in slot 622, or it can raise from a base position, shown in FIG. 3A to a wear stop position, shown in FIG. 3B.

Hard stop mechanism comprises a body 710, which can comprise a sheet material bent to align with the slot. The body 710 can be configured to rise up and down in the slot 622, but not rotate. Or, the body 710 can be welded in place, or can be seated to slide in a rail 611. As drawn, the hard stop mechanism 700 can rise from a base position to a wear stop position as an adjustment mechanism 590 moves from a starting position to an ending position.

Figure 2:
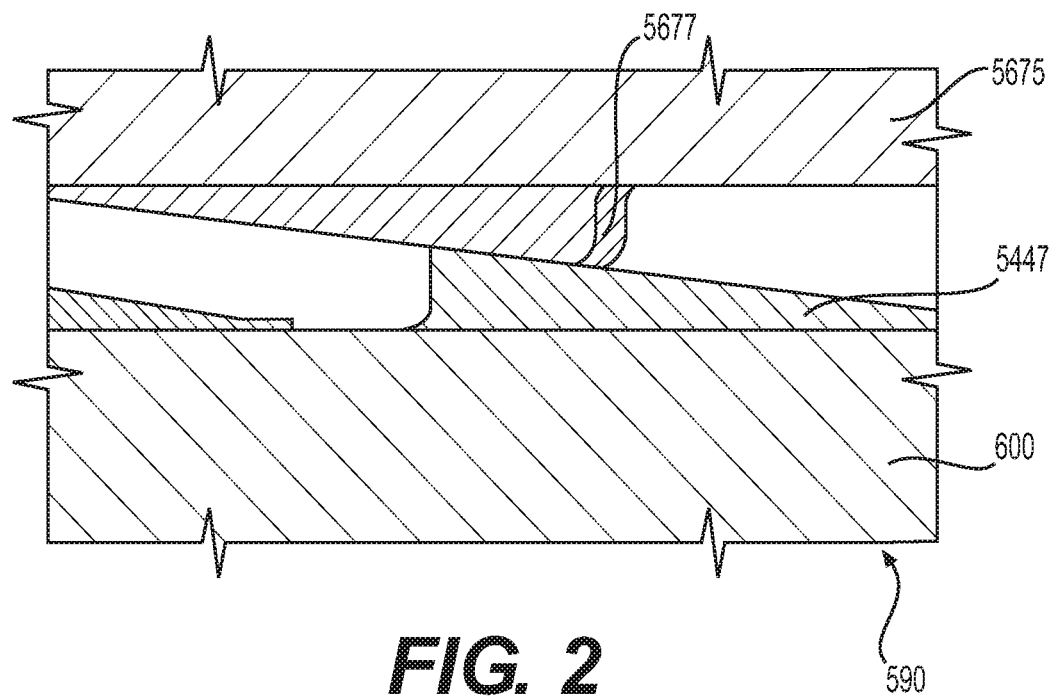
FIG. 2 is a side view of a portion of the adjustment mechanism.

Adjustment mechanism 590 can comprise ramped cams 544 & 567, which can rotate. Cam 544 is integrally formed with pressure plate 600 in this example, though it can be separately formed and anchored to the pressure plate. Or, as in other types of clutches, the cam 544 can be attached to or embedded to the clutch cover, as in the example of U.S. Pat. No. 5,531,308, incorporated herein by reference in its entirety. Adjustment mechanism 590 comprises a first ramped cam 567 opposed to and rotatable relative to a second ramped cam 544. Cam 544 comprises ramps 5447. Cam 567 has ramp 5677 integrally formed with a disk 5675, as shown in FIG. 2. As in FIG. 3A, a dust cover 570 covers a spring 582 that is circumferentially seated in groove 630 (as taught in U.S. Pat. No. 5,531,308). Spring 582 tensions the cams 544 & 567 with respect to one another so that the cams rotate, and thereby increase a spacing between the cams. This self-adjusts the distance between a clutch actuator 1000 and pressure plate 600 acting on friction disk 400 so that as the friction material 415 wears down, the pressure plate can be applied to the friction disk 400 without adjusting the actuator 1000.

In the present disclosure, dust cover 570 also includes a crimped tab 569 forming a control finger that can abut arm 720 at tip 721 when the cam 567 rotates during use. So, adjustment mechanism 590 comprises a dust cover 570 comprising a tongue 5675 and the control finger extends from the tongue. First ramped cam 567 comprises a notch 5679 seating the tongue 5675 so that the control finger extends from the notch The crimped tab 569 is an extension of a tongue 5675 on the dust cover 570. Tongue 5675 seats in notch 5679 of the cam 567 to join the rotation of the cam 567 and the dust cover. Alternatively, cam 567 can be formed to comprise a tab 569 for interfacing with arm 720. Alternative shapes, such as wedge or stepped, can be used. Other techniques for joining the dust cover 570 to the cam 567 can be used.

Arm 720 can extend from the body 710 so that at least a tip 721 of the hard stop mechanism 700 can contact the crimped tab 569 of control finger 5679. Tip 721 can alternatively or additionally seat on a rim on the cam 567. Such a rim is shown in FIG. 5. Additional rims, such as rim 5673, can be included for purposes such as seating the dust cover 570 against the cam 567, or for locating the spring 582, among others. A fulcrum 5671 is shown protruding from the cam 567 in FIG. 5, however, the dust cover 570 can alternatively protect the cam 567 by covering the fulcrum.

The adjustment mechanism 590 between the pressure plate 600 and the actuator assembly 1100 is configured so that the control finger 5675 moves from a starting position to an ending position as the adjustment mechanism adjusts a distance between the actuator assembly 1100 and the pressure plate 600 in response to wear-down of the friction material 415. When the tab 569 rotates to contact the tip 721 of the hard stop mechanism 700, the cam 567 can no longer rotate. Thus, hard stop mechanism 700 is configured to stop the movement of the adjustment mechanism when the control finger moves to the ending position The ramps 5677 & 5447 can no longer slide with respect to one another. This stops the adjustment mechanism 590 from further self-adjustments. This converts the self-adjusting clutch to a wear-through type of clutch.

As shown, the hard stop mechanism 700 is anchored to a boss 620 on pressure plate 600. Such a design is compatible with, for example, clutch systems owned by Eaton Corporation of Cleveland, Ohio including ENDURANT transmissions for land vehicles, and parts therefor. In other clutch styles, a clutch cover is configured to mount to a flywheel of an engine and the clutch cover covers portions of the driven disk assembly and the pressure plate. The adjustment mechanism is mounted under the cover, it is possible to mount the hard stop 700 to the clutch cover. Such a design is compatible with, for example, self-adjusting clutch systems owned by Eaton Corporation of Cleveland, Ohio, including ULTRASHIFT land vehicle transmission and parts thereof, namely, manual transmission shift-assist system for vehicle transmission. A boss on the cover then serves to mount the hard stop mechanism 700 so that the hard stop mechanism can reach under the cover to the self-adjust feature.

In some embodiments, it is possible to practice the methods disclosed herein without the assistance of hard stop mechanism 700. This is possible in systems where a fastener 5033, such as a shoulder bolt, screw, or rivet restricts the relative positioning of the pressure plate 600 with respect to the friction disk 400, or restricts the relative positioning of the cover 500 with respect to the pressure plate 600 or friction disk 400. Drive strap placement or boss mounting attributes can likewise fix axial relationships so that hard stop mechanism 700 can be omitted, yet still the clutch can practice the methods disclosed herein. Then, it is possible to implement a method further comprising restricting an adjustment mechanism 590 so that it ceases to adjust so that the engaged clutch positions deviate from the normal rate of change. The axial position of the release bearing 8020 can then increase due to the restricting of the adjustment mechanism 590.

Figure 7:
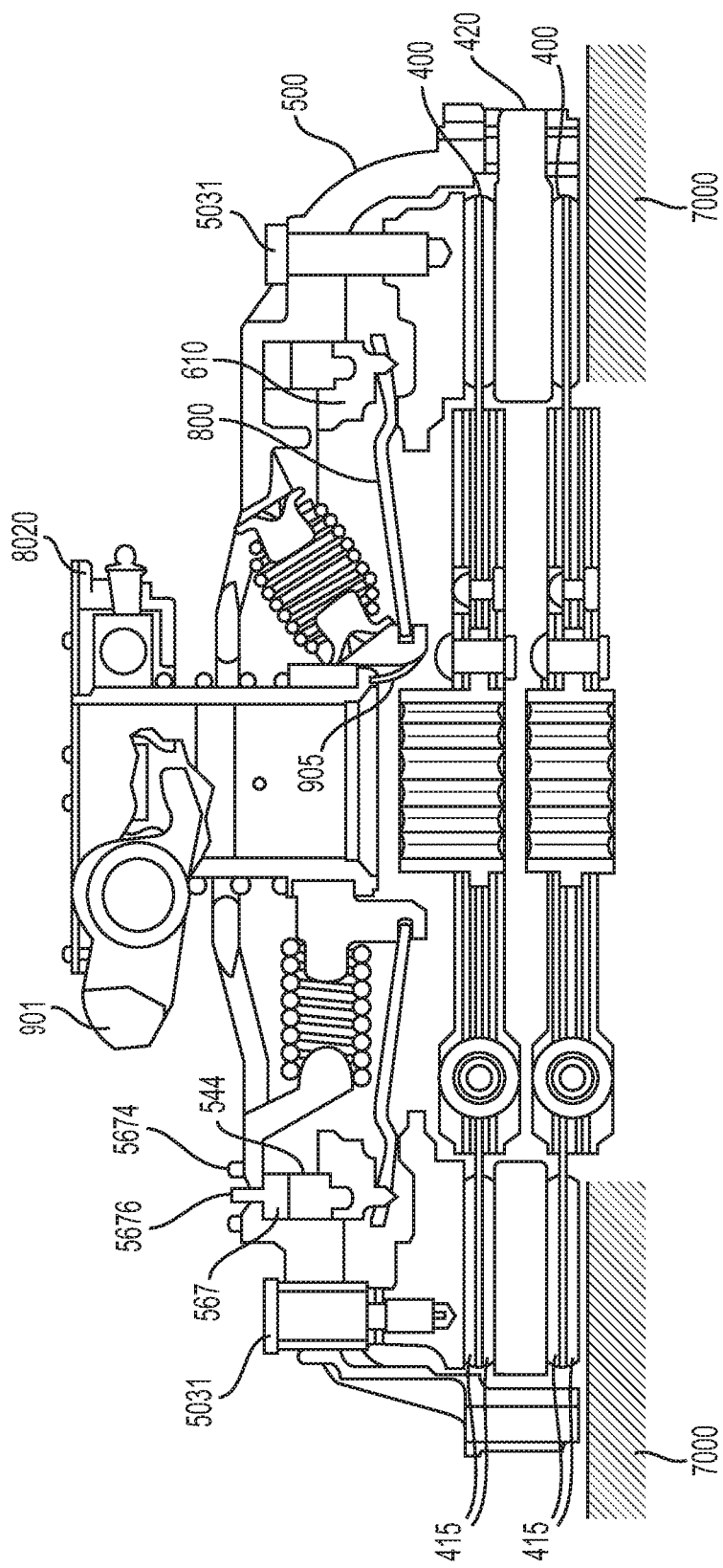
FIG. 7 is a view of an alternative clutch assembly.

FIG. 7 shows such an alternative having no hard stop mechanism 700, but an alternative means for implementing a wear-stop technique. Shoulder bolt 5031 fixes the cover 500 with respect to the pressure plate 600. Two friction disks 400 comprise four sets of friction material 415 with an intermediate plate 420 between the two friction disks 400. A flywheel 7000 is shown in broken view as the torque transmission means for coupling to the clutch assembly. The shoulder bolts 5031 can be configured to restrict the separation between the cover 500 and the pressure plate 600. Alternatively, aspects of the visual indicator for wear can be configured to restrict the ability of the cam 567 to rotate relative to the cam 544. Cam 544 can be seated stationary in ring 610, as by cleats. Cam 567 can rotate, as the friction material 415 wears down. But, tab 5676 on cam 567 can abut a terminus of a slot in the cover. The slot can be flanked by a visual indicator 5674. When coupled with one or more sensors (S1, S2, S3) and the ECU 5000, redundancy to visual inspection can be provided, as by OBD service codes.

Whether a wear-though style clutch or a self-adjusting clutch, or a self-adjusting clutch that converts to a wear-through style clutch, it is desired to know when the friction material is worn down. So, it is possible to implement wear-down detection techniques for signaling that the clutch is worn.

Figure 6:
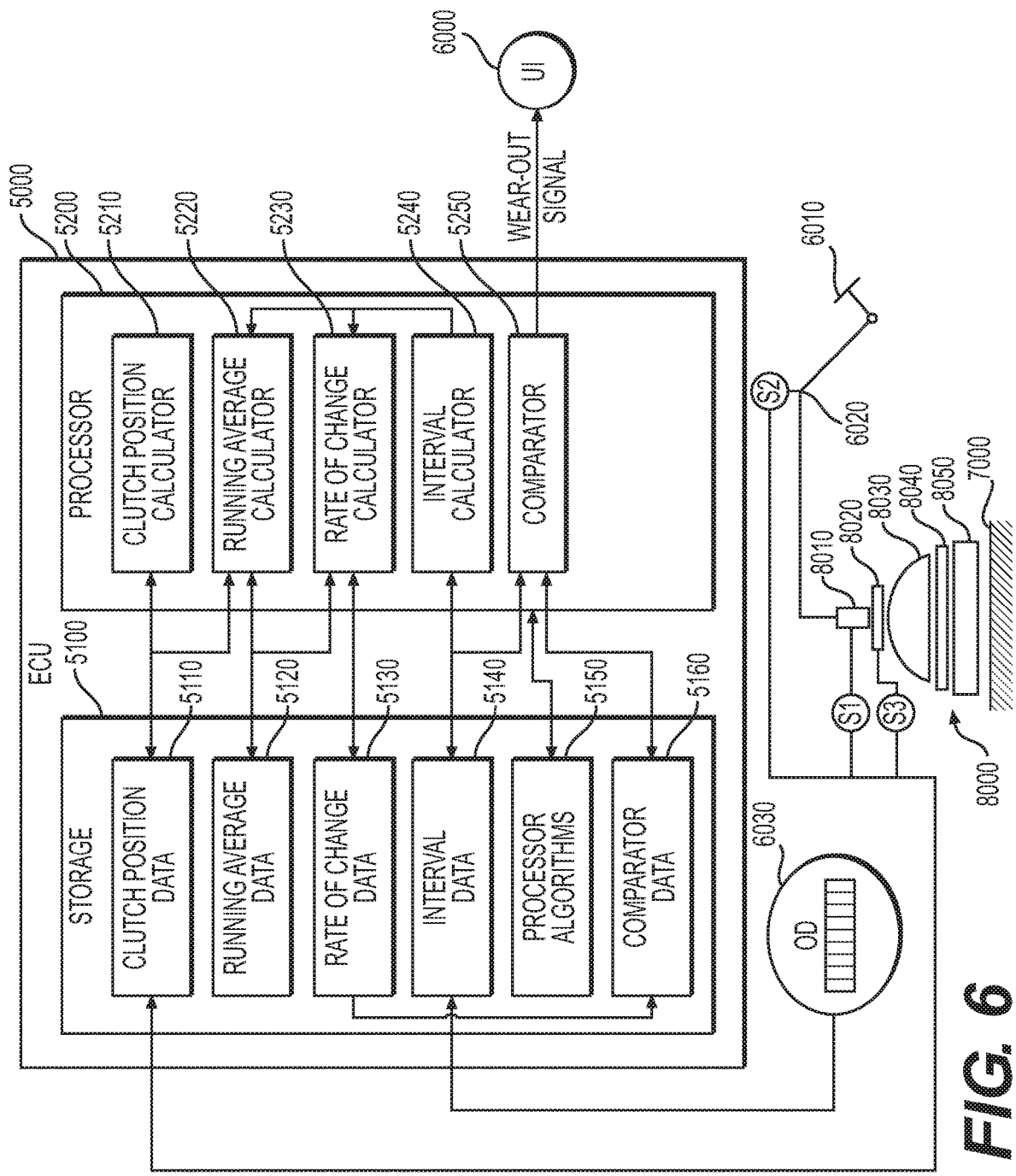
FIG. 6 is a schematic of a vehicle system comprising a clutch assembly and an electronic control unit configured to practice the methods disclosed herein.

Turning to FIG. 6, actuator assembly 1100 of clutch assembly 8000 comprises an actuator 8010. This disclosure can be implemented with different types of actuators, including but not limited to remote actuator, concentric actuator, electric actuator, pneumatic actuator, hydraulic actuator, linear actuator, and rotational actuator, with any type of linkage which connects the actuator 8010 to the clutch assembly 8000.

Where the actuator 1000 of FIG. 5 comprised an internal sensor S1, in FIG. 6, the actuator sensor S1 is externally mounted from the actuator 8010. The sensor S1 senses one or more of the extent of the actuator or the physical actuator position so as to detect engaged clutch positions by monitoring an actuator assembly position. Data from actuator sensor S1 can be used to detect engaged clutch positions as by monitoring an extent of actuation of an actuator assembly 1100 necessary to engage a pressure plate 600, 8040 with a friction disk 400, 8050 so that the friction disk 400, 8050 can grip a flywheel 7000 or other torque transferring surface. Actuator sensor S1 can thus be configured to sense a position of the actuator assembly 1100 relative to the pressure plate 8040 in response to wear-down of the friction material on friction disk 8050.

Actuator 8010 is stacked over a release bearing 8020 and a cover assembly 8030. Cover assembly 8030 can comprise similar contents to FIG. 5 or 7, such as the diaphragm spring 800, self-adjustment mechanism, or alternative structures. Release bearing can be associated with a bearing sensor S3 that can sense the position of the release bearing 8020. For example, the release bearing can move axially over time as the friction material 415 wears off friction disk 8050. As an alternative, bearing sensor S3 can sense the relative positions, or distances between the release bearing 8020 and the actuator 8010.

An input sensor S2 can sense the position of a shift fork 6020 or other articulation of a clutch shift pedal 6010. So, when a user requests a clutch disengagement or engagement, as by appropriately engaging the clutch shift pedal 6010, input sensor S2 can accumulate data on the extent of motion of the clutch shift pedal 6010, which can also change over the lifetime of the clutch as the friction material 415 wears.

The actuator sensor S1, the input sensor S2, and the bearing sensor S3 can be used in the alternative or in the aggregate to supply clutch position data 5110.

When there is no load applied by the actuator 1000, 8010 the clutch is considered fully engaged. In this state, the full force of the diaphragm spring 800 reacts against the mounting 905 at the pivot fulcrum location and pushes the pressure plate 600, 8040 towards the engine to clamp the friction disk 400, 8050 (DDA) against the flywheel 7000. As the DDA friction material 415 wears throughout life, the pressure plate 600, 8040 moves towards the flywheel 7000 in the amount of this wear. If there is no adjustment mechanism 590 to compensate for the wear, the diaphragm spring 800 would rotate at the pivot fulcrum to follow the pressure plate 600, 8040. This results in a change in the fully engaged actuator position equal to the product of the axial amount of wear, the lever ratio of the diaphragm spring, and the lever ratio of the clutch release linkage. In a self-adjusting clutch, an adjustment mechanism 590 is utilized to keep the apply fulcrum axial position stationary as the friction material wears. But, even with an adjustment mechanism 590, it is still possible that the apply fulcrum axial position can move. The methods disclosed herein detect the motion.

In the example with adjustment mechanism 590 comprising the hard stop mechanism 700, the hard stop mechanisms 700 are positioned with respect to control fingers 569 such that the range of self-adjust axial movement is slightly less than the thickness of usable friction material 415. Then, the clutch would stop self-adjusting and the engaged actuator position would begin to drift just before the usable friction material wears out. The system could detect this change in actuator position as described below and broadcast a message to service the clutch before the destructive failure modes described above occur. In clutches lacking a hard stop mechanism 700, a drift in the engaged actuator position that deviates more than delta from a normal drift and thus crosses a predetermined threshold can be detected to result in the broadcast message.

Figure 4A:
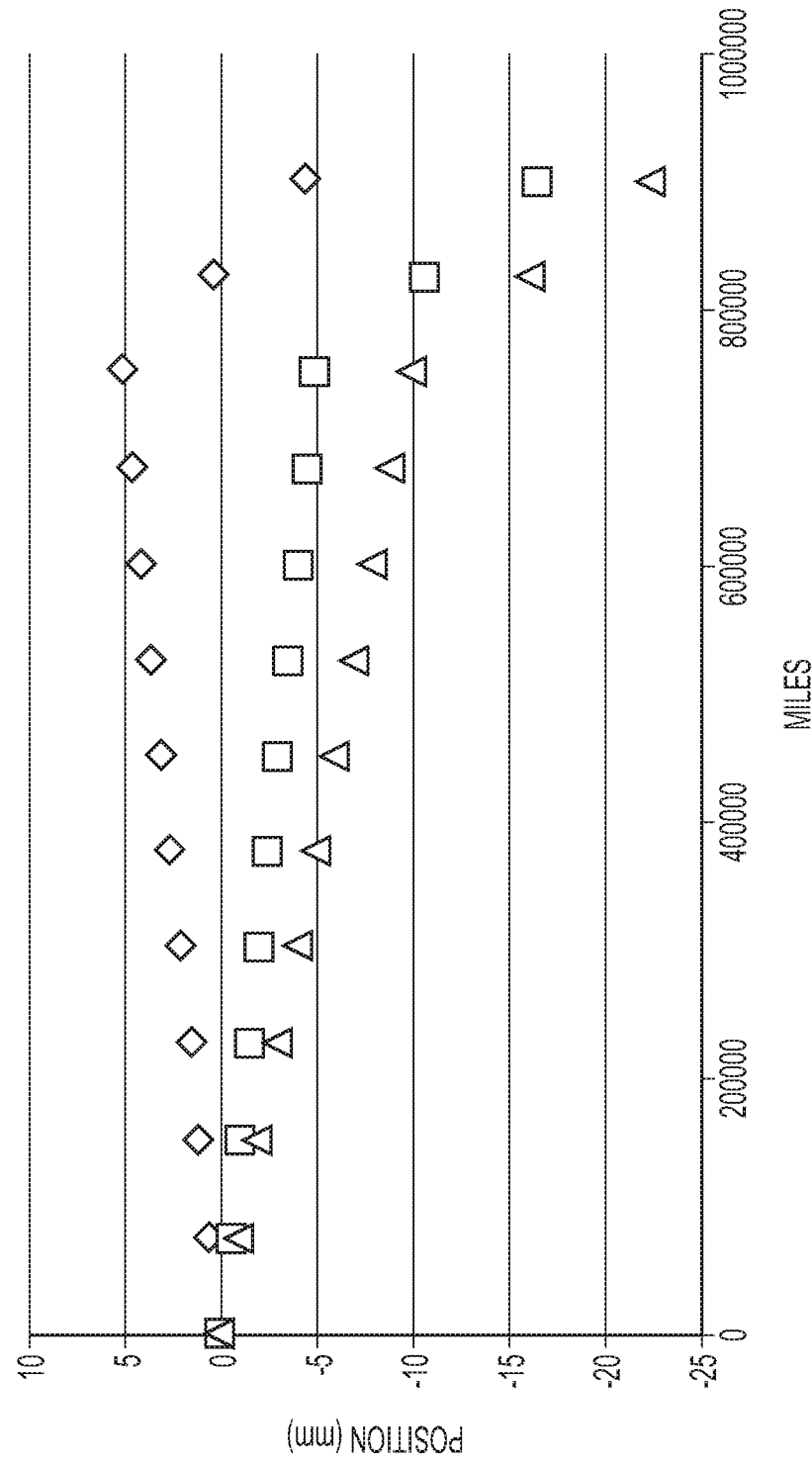
FIGS. 4A & 4B are graphs for explaining an engaged clutch actuator position over the usable life of an exemplary clutch.
Figure 4B:
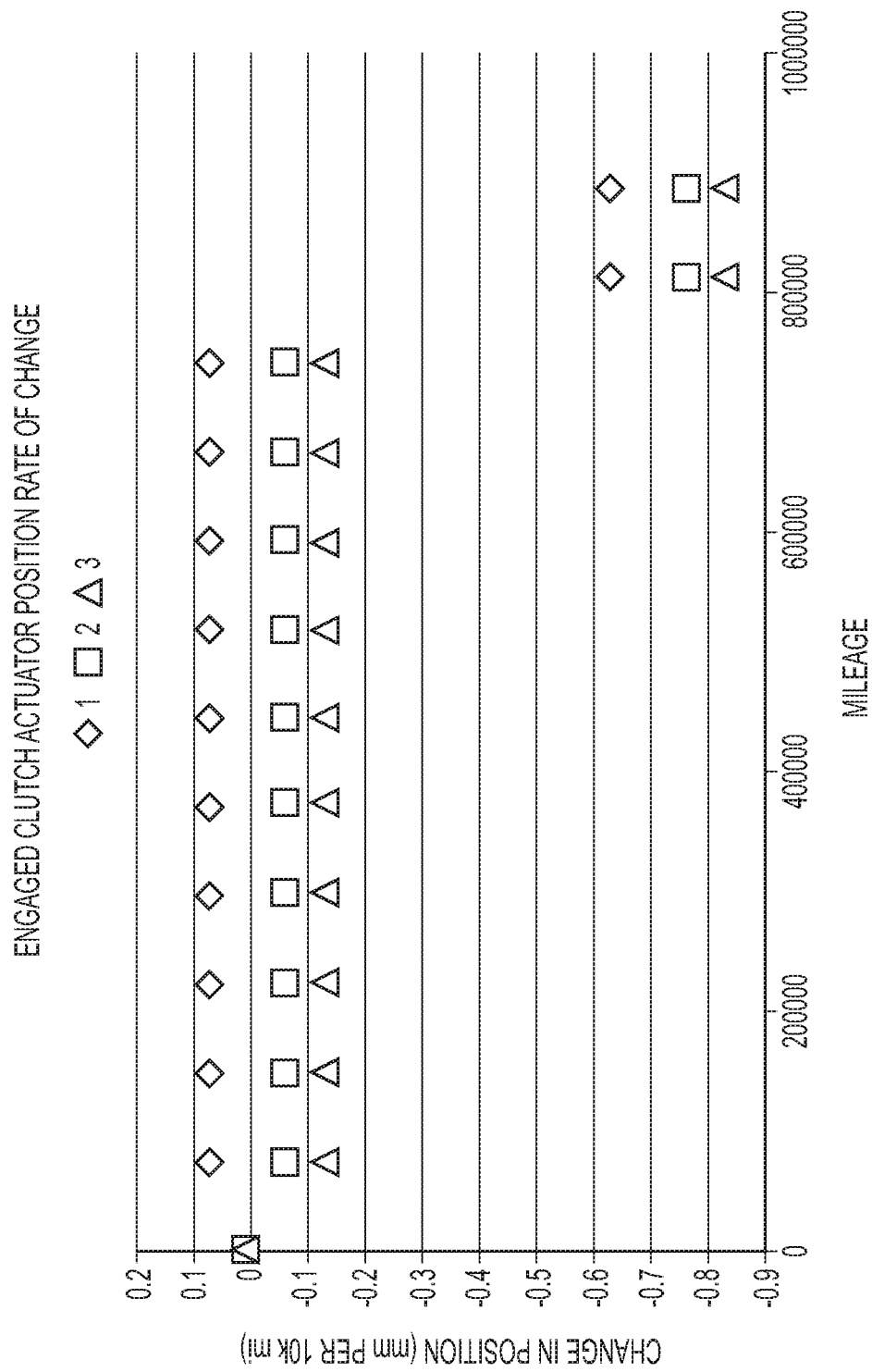

FIGS. 4A & 4B show examples of how the worn clutch detection could be made. There will be some wear in the clutch and actuation system that is not compensated for by the adjustment mechanism. Examples of uncompensated wear can include, lost tension in diaphragm spring 800, wear on linkage 901, or wear in shift fork 6020, among others. The net effect of the uncompensated wear points will be a slight change in engaged clutch actuator position over the life of the system, either positive or negative, that should be fairly linear. But, the magnitude of movement for the uncompensated wear will be small in comparison to the magnitude of the movement in the engaged clutch actuator position that occurs when the clutch no longer self-adjusts.

In non-self-adjusting, or wear through, systems, the magnitude of movement can also change over time because the diaphragm spring 800 can move with respect to its fulcrum points to follow the pressure plate 600 as the friction material wears down. The magnitude of difference is due to the amplification of the movement of the clutch actuator position. Even if the amount of wear and engaged clutch position change remains linear, the algorithm can be used to accumulate clutch engaged positions. Eventually, the wear-through clutch can be used no more, yielding a deviation in the numerical rate of change, and the disclosed methods can ultimately check for this deviation from the normal rate of change.

In many cases, the amplification of the movement of the clutch actuator position is caused by the lever ratio of the diaphragm spring 800. As above, the diaphragm spring 800 can rotate at the pivot fulcrum to follow the pressure plate as the friction material 415 wears down. Depending on whether the clutch is a push type or a pull type, this leads the engaged clutch actuator position to move towards the engine or towards the transmission over time. Other instances where the engaged clutch actuator position drifts positively towards the engine can be when there is wear between the diaphragm spring 800 and the release bearing 8020, or wear between the release bearing 8020 and the linkage 901, or wear between the release bearing 8020 and the actuator 8010. Instances when the clutch actuator position moves negatively, or towards the transmission, can be when, for example, there is wear between the fulcrum interfaces, such as where the diaphragm spring 800 contacts a fulcrum point, such as fulcrum 5671, mounting 905, fitting ring 804. All of these changes in clutch position data can be in tandem with changes in the wear down of the friction material 415.

In the first example of FIG. 4A, indicated by diamonds, clutch position is related to the clutch actuator position, and the engaged clutch actuator position is positive over time. The clutch actuator moves towards the engine until the last two points, when the engaged clutch actuator position drifts negatively, towards the transmission at a different rate of change than the prior positive drift. In examples 2 (squares) & 3 (triangles), the engaged clutch actuator position drifts negatively (towards the transmission and away from the engine) at a rate of change that likewise shifts significantly in magnitude near the end of life of the friction disc 400. The changes in magnitude can be the result of aggregated changes in the clutch over time, due to those wear points listed above. Additionally or alternatively, the change in magnitude can be the result of the hard stop mechanism engaging and forcing the clutch from self-adjusting to a wear-through type of clutch.

In FIG. 4A, the clutch position data illustrated is related to the clutch actuator 1000, 8010. Actuator sensor S1 can detect that some aspect of the clutch actuator assembly 1100 has moved. For example, in the case of a linear actuator, the actuator can be physically embedded in a housing and fixed relative to the clutch assembly 8000, yet the linear actuating portion of the linear actuator has to further extend over time, and this extension of the linear actuator is sensed. Or, the catapult linkage 901 can move over a greater distance over time, and this can be sensed. Or, the release bearing 8020 moves, and the stacked actuator 8010 moves with it, such as at coupling 900. Either or both of actuator sensor S1 or bearing sensor S2 can collect data for deriving the clutch position in this last example.

FIG. 4B illustrates that the rate of change in the clutch position, in this example, the clutch actuator position, is fairly constant over much of the life of the clutch, but the rate of change deviates at the last two points. As above, the deviation is due to the hard stop mechanism 700 engaging or is due to the aggregate effect of nonlinear changes in the clutch system, or both.

FIGS. 4A & 4B illustrate the premise of recording a running average of engaged clutch positions. Every x miles, an electronic control unit (ECU) 5000 could store that average and start to record a new running average. Over time the system could use these recorded running averages to determine a historical rate of change of engaged clutch actuator positions (0.05 mm per 10 k miles for example). When the ECU system sees that this rate changes from the historical value minus some offset it would trigger a signal that the clutch is worn.

Figure 8:
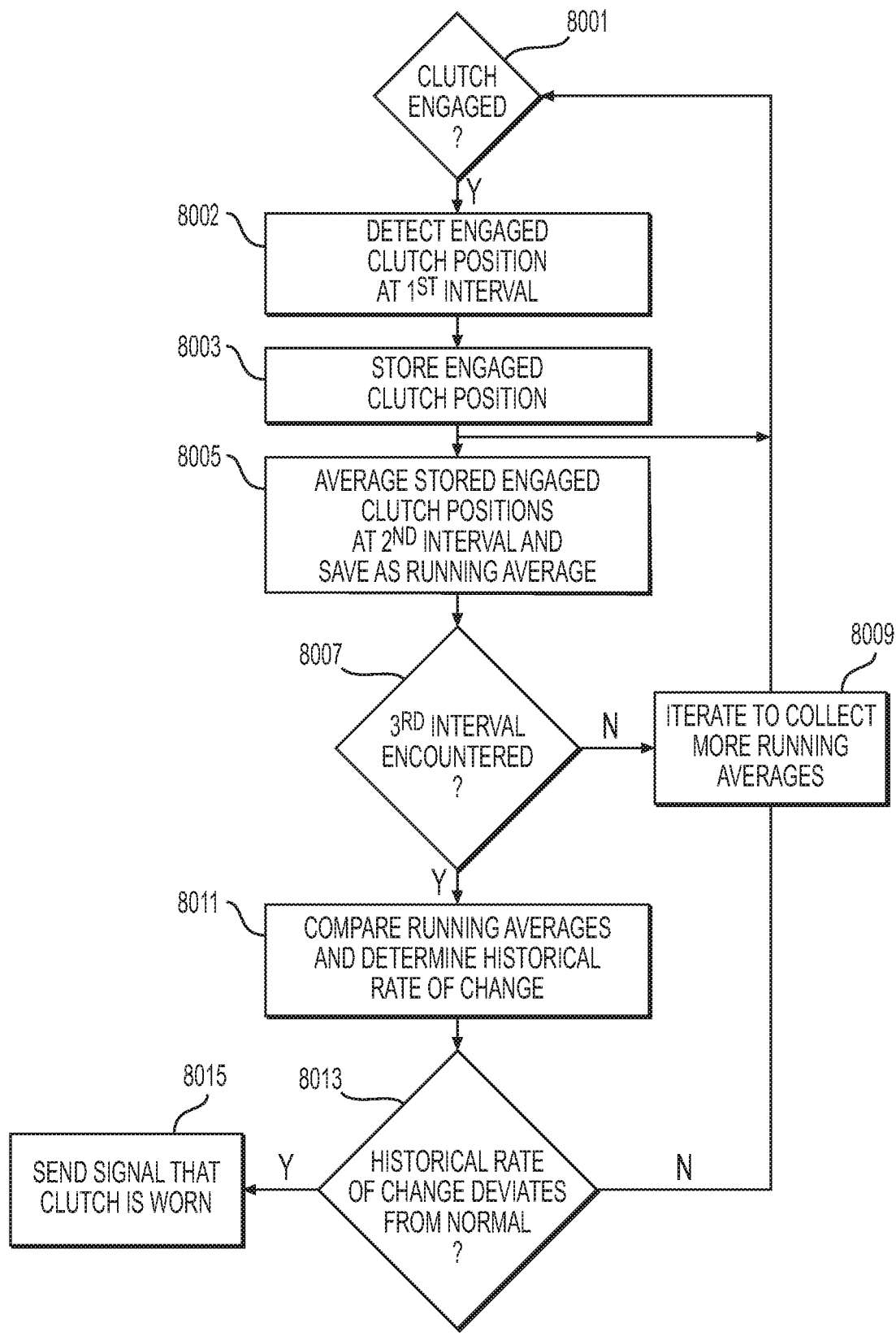
FIG. 8 is a flow diagram of a method for clutch wear notification

A method of clutch wear notification is outlined in FIG. 8 and can be implemented by the ECU 5000 shown in schematic in FIG. 6. The method can comprise determining that the clutch is engaged in step 8001. One of the sensors (S1, S2, S3) can detect motion in its respective device, and then the extent of that motion, so that in step 8002, it is possible to collect clutch position data and thereby detect engaged clutch positions at a first interval.

Clutch position data 5110 can be stored in storage device 5100 of ECU 5000. Processor algorithms 5150 can be stored and accessed by processor 5200. Processor 5200 can comprise subprocessors or the processor algorithms 5150 can comprise allocation programming to compartmentalize processing of various aspects of the disclosed methods. A clutch position calculator 5210 can thus access and process the clutch position data 5110 to determine the engaged clutch position. As before, the engaged clutch position is influenced by a number of wear characteristics of the clutch assembly 8000, including the wear-down of the friction material 415. So, depending on the wear characteristic sensed, the wear-down of the friction material 415 can be appropriately derived. The engaged clutch position value is stored in step 8003, which can comprise storing the calculated engaged clutch position in a data block with clutch position data 5110.

To limit processing burdens and to yield a meaningful rate of change, the algorithm can be based on a number of intervals. The intervals can be time-based (every number of seconds, minutes or hours of operation time) or, as drawn, mileage-based. For example, an odometer (OD) 6030 can track miles driven, and intervals for processing can be based on odometer readings stored as interval data 5140. The interval data 5140 can be accessed by an interval calculator 5240. Then, when certain intervals are reached, the appropriate processing can be triggered.

For example, a first interval can comprise triggering clutch position calculator 5210 to process clutch position data processing to calculate an engaged clutch position in step 8002 every N1, N2, N3 . . . miles. A second interval can comprise triggering running average calculator 5220 to calculate an average of stored engaged clutch positions accumulated over the second interval, and then save them as running averages with the running average data 5120, in step 8005 every M1, M2, M3 . . . miles. Until a third interval P1, P2, P3 . . . is encountered, as in decision block 8007, the process of collecting clutch position data and processing to detect engaged clutch positions and running averages iterates, as in step 8009. It is possible that P>M>N so that more engaged clutch positions are detected and calculated more frequently than running averages, and more running averages are calculated more frequently than rates of change.

When the third interval P1, P2, P3 is encountered, the accumulated running average data 5120 is called to compare in rate of change calculator 5230 to determine a historical rate of change as in step 8011. The results can be stored as historical rate of change data 5130.

A decision block 8013 can comprise deciding whether or not the historical rate of change deviates from a normal rate of change. This can comprise calling the rate of change data to a comparator 5250 or copying rate of change data to comparator data 5160 for access by the comparator 5250, among others. The comparator data 5160 can additionally comprise data or algorithms for looking up or deriving the deviation from normal. So, the normal rate of change can comprise an offset to permit a range of fluctuations without indicating that the rate of change in the clutch positions deviates from the normal rate of change. The deviation can be based on one or more of the type of clutch (wear-through or self-adjusting), friction material (organic, ceramic, composite), number of friction discs 400 (1, 2), number of friction facings, among others. Deviating from a normal rate of change can occur, for example, when a diaphragm spring has rotated relative to the pressure plate beyond a predetermined degree. In some instances, determining that a predetermined limit has been reached can also lead to clutch wear notification, such as by setting an absolute limit. Change over time in the clutch position can reach the absolute limit for aggregate change and then a wear signal can be sent. In any case, the signal that the clutch is worn is sent in step 8015, as by the comparator 5250 yielding a result that triggers the processor to send a wear-out signal to a user interface 6000, such as by lighting a dashboard indicator, generating an on-board diagnostics (OBD) code, or the like.

The method is designed to detect the point where a self-adjusting clutch converts from a self-adjusting mode, whereby a cam can rotate relative to a wear-stop, to a wear-through mode, whereby the cam cannot rotate relative to the wear-stop.

Other implementations will be apparent to those skilled in the art from consideration of the specification and practice of the examples disclosed herein.

What is claimed is:

1. A method of clutch wear notification, comprising;
    detecting engaged clutch positions at a first interval;
    storing the values of the engaged clutch positions;
    averaging the stored values of the engaged clutch positions at a second interval to create running averages;
    storing the running averages;
    comparing the running averages to determine a rate of change in the clutch positions; and
    signaling a clutch wear-out when comparing the running averages indicates that the rate of change in the engaged clutch positions deviates from a historical rate of change of engaged clutch positions.

2. The method of claim 1, wherein comparing the running averages to determine a rate of change in the clutch positions is done at a third interval.

3. The method of claim 1, wherein the historical rate of change comprises an offset.

4. The method of claim 1, comprising converting a self-adjusting clutch from a self-adjusting mode, whereby a cam can rotate relative to a wear-stop, to a wear-through mode, whereby the cam cannot rotate relative to the wear-stop.

5. The method of claim 1, comprising deviating from the historical rate of change when a diaphragm spring has rotated relative to a pressure plate beyond a predetermined degree.

6. The method of claim 1, wherein detecting engaged clutch positions comprises monitoring a release bearing position.

7. The method of claim 1, wherein detecting engaged clutch positions comprises monitoring an actuator assembly position.

8. The method of claim 1, wherein detecting engaged clutch positions comprises monitoring an extent of actuation of an actuator assembly necessary to engage a pressure plate with a friction disk.

9. The method of claim 1, wherein detecting engaged clutch positions comprises monitoring a clutch pedal position.

10. The method of claim 1, further comprising configuring an adjustment mechanism to restrict the engaged clutch positions.

11. The method of claim 10, further comprising increasing an axial position of a release bearing.

12. A method of clutch wear notification, comprising;
    detecting clutch actuator positions of an engaged clutch at a first interval;
    storing the values of the clutch actuator positions;
    averaging the stored values of the clutch actuator positions at a second interval to create running averages;
    storing the running averages;
    comparing the running averages to determine a rate of change in the clutch actuator positions; and
    signaling a clutch wear-out when comparing the running averages indicates that the rate of change in the clutch actuator positions deviates from a historical rate of change of clutch actuator positions.

13. The method of clutch wear notification of claim 12, comprising applying an offset to the comparison of running averages before signaling a clutch wear-out.

14. A method of clutch wear notification, comprising;
    detecting clutch actuator positions of an engaged clutch at a first interval;
    calculating positions of the engaged clutch by processing the detected clutch actuator positions;
    storing values of the calculated engaged clutch positions;
    averaging the stored values of the calculated engaged clutch positions at a second interval to create running averages;
    storing the running averages;
    comparing the running averages to determine a rate of change in the engaged clutch positions; and
    signaling a clutch wear-out when comparing the running averages indicates that the rate of change in the engaged clutch positions deviates from a historical rate of change of engaged clutch positions.

* * * * *

UNITED STATES PATENT AND TRADEMARK OFFICE
CERTIFICATE OF CORRECTION

| | | |
|---|---|---|
| PATENT NO. | : 11,009,091 B2 | Page 1 of 1 |
| APPLICATION NO. | : 16/335867 | |
| DATED | : May 18, 2021 | |
| INVENTOR(S) | : William Andrew David et al. | |

It is certified that error appears in the above-identified patent and that said Letters Patent is hereby corrected as shown below:

On the Title Page

Item (71) Applicant, should read:
Eaton Intelligent Power Limited, Dublin (IE)

Signed and Sealed this
Eighth Day of June, 2021

Drew Hirshfeld
*Performing the Functions and Duties of the
Under Secretary of Commerce for Intellectual Property and
Director of the United States Patent and Trademark Office*